United States Patent
Chow et al.

(10) Patent No.: US 9,477,541 B2
(45) Date of Patent: Oct. 25, 2016

(54) DETERMINING FAULTY NODES VIA LABEL PROPAGATION WITHIN A WIRELESS SENSOR NETWORK

(71) Applicant: City University of Hong Kong, Kowloon (HK)

(72) Inventors: Wai-shing Tommy Chow, Hong Kong (CN); Mingbo Zhao, Hong Kong (CN)

(73) Assignee: City University of Hong Kong, Kowloon (HK)

( * ) Notice: Subject to any disclaimer, the term of this patent is extended or adjusted under 35 U.S.C. 154(b) by 124 days.

(21) Appl. No.: 14/184,916

(22) Filed: Feb. 20, 2014

(65) Prior Publication Data

US 2015/0234694 A1    Aug. 20, 2015

(51) Int. Cl.
| | | |
|---|---|---|
| H04L 1/00 | (2006.01) | |
| G06F 11/07 | (2006.01) | |
| H04L 12/26 | (2006.01) | |
| H04L 12/24 | (2006.01) | |

(52) U.S. Cl.
CPC ......... *G06F 11/0751* (2013.01); *H04L 41/064* (2013.01); *H04L 43/0858* (2013.01)

(58) Field of Classification Search
CPC .... G06F 11/07; G06F 11/0751; H04L 12/24; H04L 41/0631; H04L 47/10; H04L 47/283
See application file for complete search history.

(56) References Cited

U.S. PATENT DOCUMENTS

| | | | | |
|---|---|---|---|---|
| 6,839,754 | B2 * | 1/2005 | Nowak | H04L 12/2697 709/224 |
| 2005/0037714 | A1 | 2/2005 | Maucksch et al. | |
| 2006/0133293 | A1 | 6/2006 | Pan et al. | |
| 2010/0128703 | A1 | 5/2010 | Brand et al. | |
| 2011/0205889 | A1 | 8/2011 | Chen et al. | |
| 2013/0217382 | A1 | 8/2013 | Kudo | |

OTHER PUBLICATIONS

Liu et al., "A low cost and accurate indoor localization algorithm using label propagation based semi-supervised learning", Dec. 16-19, 2009.*

Z. S. Daliri, S. Shamshirband, and M. A. Besheli, "Railway security through the use of wireless sensor networks based on fuzzy logic," International Journal of the Physical Sciences, vol. 6, No. 3, pp. 448-458, 2011, 11 Pages.

S. Ray, A. Goel, and N. Chandra, "Accident Detection by Wireless Sensor Network and Sending Rescue Message with GPS," Journal of Computing, vol. 3, No. 11, pp. 69-73, 2011, 5 Pages.

Depienne, "Wireless Sensor Networks Application for Agricultural Environment Sensing in Developing Countries," Ecole Polytechnique Federale De Lausanne, 2007, 60 pages.

Baggio, "Wireless sensor networks in precision agriculture." p. 2, 2005, 2 pages.

(Continued)

*Primary Examiner* — Jae Y Lee
*Assistant Examiner* — Aixa Guadalupe Cruz
(74) *Attorney, Agent, or Firm* — Amin, Turocy & Watson, LLP

(57) ABSTRACT

Fault detection within wireless sensor networks can be determined by label propagation training within a wireless network system based on normal and faulty node conditions. The training information is then used to propagate node information to neighboring data vectors, which generates an indication of faulty nodes or an indication of a normal transmission path.

20 Claims, 9 Drawing Sheets

(56) References Cited

OTHER PUBLICATIONS

Gao, et al., "The Advanced Health and Disaster Aid Network: A Light-Weight Wireless Medical System for Triage," IEEE Transactions on Biomedical Circuits and Systems, vol. 1, No. 3, pp. 203-216, 2007, 14 pages.
Mills, "Internet time synchronization: The network time protocol," IEEE Transactions on Communications, vol. 39, No. 10, pp. 1482-1493, 1991, 29 pages.
M. Akhlaq and T. R. Sheltami, "RTSP: An Accurate and Energy-Efficient Protocol for Clock Synchronization in WSNs," IEEE Transactions on Instrumentation and Measurement, vol. 62, No. 3, pp. 578-589, Mar. 2013, 12 Pages.
Lee et al.,"IEEE 1588 standard for a precision clock synchronization protocol for networked measurement and control systems," vol. IEEE Std. , No. July. pp. 1-269, 2008, 154 Pages.
A. Sengupta and A. T. Dahbura, "On Self-Diagnosable Multiprocessor Systems: Diagnosis by the Comparison Approach," IEEE Transactions on Computers, vol. 41, No. 11, pp. 1386-1396, 1992, 8 Pages.
Buratti, et al., "An overview on wireless sensor networks technology and evolution.," Sensors (Basel, Switzerland), vol. 9, No. 9, pp. 6869-6896, Jan. 2009, 28 pages.
R. Shalini, "Global Markets and Technologies for Wireless Sensors," 2012, 23 Pages.
Youn, et al., "Class dependent feature scaling method using naive Bayes classifier for text datamining," Pattern Recognition Letters, vol. 30, No. 5, pp. 477-485, Apr. 2009.
Soria, et al., "A 'non-parametric' version of the naive Bayes classifier," Elsevier; Knowledge-Based Systems, vol. 24, No. 6, pp. 775-784, Aug. 2011,10 pages.
Koc, et al., "A network intrusion detection system based on a Hidden Naive Bayes multiclass classifier," Expert Systems with Applications, vol. 39, No. 18, pp. 13492-13500, Dec. 2012.
Non-Final Office Action, Dated Sep. 17, 2015, For U.S. Appl. No. 14/164,906, 17 pages.
Notice of Allowance dated Feb. 8, 2016 for U.S. Appl. No. 14/164,906, 20 pages.

* cited by examiner

DETERMINING FAULTY NODES VIA LABEL PROPAGATION WITHIN A WIRELESS SENSOR NETWORK

TECHNICAL FIELD

This disclosure relates generally to facilitation of detection of faulty nodes based on labeling of unlabeled data vectors.

BACKGROUND

Wireless Sensor Networks (WSNs) are made of spatially distributed sensors to monitor physical or environmental conditions and to cooperatively pass their data through the network to a main location. WSN system monitoring and controls are used in a variety of applications such as: railway security, transportation systems, agricultural monitoring, healthcare devices, etc. The cost of sensor nodes is variable depending on the complexity of the individual sensor nodes. Therefore, size and cost constraints on sensor nodes result in corresponding constraints on resources such as energy, memory, computational speed, and communications bandwidth. Failures within these sensor nodes may occur due to signal disturbance, battery depletion, and/or excessive data transmissions. Therefore, a failure detection scheme, with low energy consumption, is needed to minimize the maintenance cost and maximize network performance.

The above-described background relating to WSN fault detection is merely intended to provide a contextual overview of some current technology, and is not intended to be exhaustive. Other context regarding the state of the art may become further apparent upon review of the following detailed description.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the purpose of this summary is to present some concepts related to some exemplary non-limiting embodiments in simplified form as a prelude to more detailed description of the various embodiments that follow in the disclosure.

Described herein are systems, methods, articles of manufacture, and other embodiments or implementations that can facilitate establishment of WSN fault detection. Facilitating the establishment of WSN fault detection can be implemented in connection with any type of device with a connection to a communications network (a wireless communications network, the Internet, or the like), such as a mobile handset, a computer, a handheld device, or the like.

According to one embodiment, described herein is a method for determining propagation delays associated with one or more packets of a network. The method can determine faulty nodes within a WSN by propagating faulty node information of labeled data vectors and predicting faulty nodes of unlabeled data vectors.

According to another embodiment, an article of manufacture, such as a computer readable storage medium or the like, can store instructions that, when executed by a computing device, can facilitate the determining of propagation delays associated with packets of a network. The article of manufacture can determine faulty nodes within a WSN by propagating faulty node information of labeled data vectors and predicting faulty nodes of unlabeled data vectors.

According to yet another embodiment, described herein is an apparatus for determining propagation delays associated with one or more packets of a network. The apparatus can determine faulty nodes within a WSN by propagating faulty node information of labeled data vectors and predicting faulty nodes of unlabeled data vectors.

Additionally, according to a further embodiment, described herein is a system that can provide a determination of propagation delays associated with one or more packets of a network. The system can determine faulty nodes within a WSN by propagating faulty node information of labeled data vectors and predicting faulty nodes of unlabeled data vectors.

The system can include a display component that can be used to used to access information about the faulty network. The system can also include one or more servers in a cloud computing environment that can store information about the faulty network.

These and other embodiments or implementations are described in more detail below with reference to the drawings.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
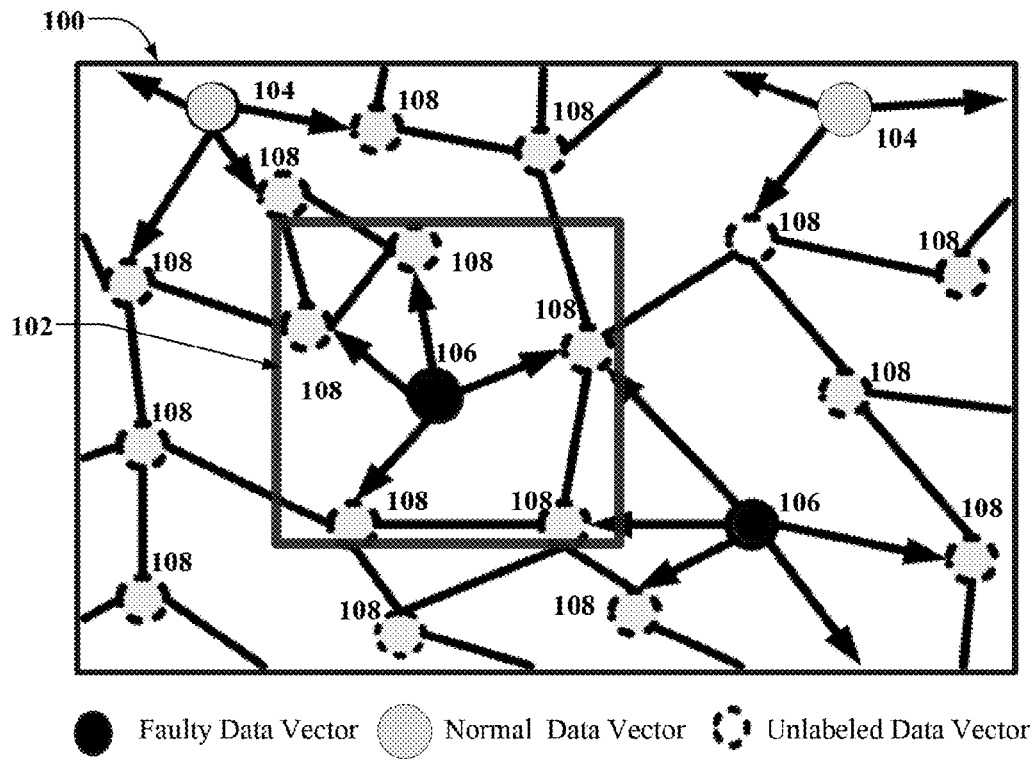
FIG. 1 illustrates a data vector scene of faulty, normal, and unlabeled data vectors.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

In various embodiments, existing information from use in a packet frame protocol can be used to detect failures. In this regard, using existing information in a packet frame protocol uses less energy because additional diagnostic packet transmissions are not implicated. The use of hardware clocks within the sensor nodes for communication protocols and time synchronization technologies have made the use of packet propagation delay detection a viable failure detection method. Therefore, packet propagation delays can be used to assess the network status based upon the premise that abnormal delays can be caused by faulty nodes or network congestion; this allows for the system to be trained with limited historical operation data and provide relatively accurate failure reports.

Each sensor in an WSN node typically can have several components, e.g., a radio transceiver with an internal antenna or connection to an external antenna, a microcontroller, an electronic circuit for interfacing with the sensors and an energy source, usually a battery or an embedded form of energy harvesting. It is possible for one or more of these components to fail causing a node failure.

Failure detection technology is generally classified as centralized approaches and distributed approaches. The centralized approach usually makes the diagnostic decisions by periodically injecting requests or queries to other nodes and waits for replies. The updated network status and individual node performance is assessed according to the status reporting messages from nodes or data comparison with neighbors. The distributed approaches compare data obtained from the neighboring nodes and disseminates failure detections at each node. The two existing approaches, however, use additional communication packets to update node statuses.

As an overview of the various embodiments presented herein, to correct for the above identified deficiencies and other drawbacks of detection of faulty nodes, various embodiments are described herein to facilitate detection of faulty nodes.

The graph-based theory can be used when there are a large number of scenes and only a few of them can be labeled. The goal of label propagation, within the graph-based theory, is to propagate label information of labeled data vectors to unlabeled data vectors according to the distribution associated with both the labeled and unlabeled data vectors, through which the predicted labels of the unlabeled data vectors can be obtained. A scene is a preprocessed data vector from consecutive signals received by a sink node. The vector dimension equals the total number of nodes in the network and each element of the vector represents the statistic mode of the transmission time from a specific source node. For example, if ninety nodes sent signals to a sink node in a one hundred node network within a scene, the transmission time would be extracted from the packets and divided into 90 groups according to the source node of each packet. The sink node does not receive any packets from a faulty node and therefore, the element will remain empty in the vector related to the faulty node. If more than one packet is received from the same node, the statistic mode of the transmission time is estimated and assigned to the specific vector element.

The overall label propagation technique is represented by: Equation (1) $X=[X_1, X_n^-]=[x_1, x_7, \ldots, x_l, x_{l+1}, \ldots, x_{l+u}] \in R^{Dx(l+u)} \ldots$, where X is the labeled and unlabeled data matrix, D is the number of features, $x_j$ is the data vector representing each sample, and the first l is the remaining u columns in X are the labeled and unlabeled data matrix respectively. Each labeled sample in $X_l$ is associated with a class label $c_i$, $i \in [1, 2, \ldots, c]$. The label propagation technique procedure comprises a preprocessing stage, a training stage, and a detection stage.

The preprocessing stage begins by determining packet delays of each scene ([$scene_1$, $scene_2$ ... $scene_n$]) associated with the nodes within a WSN. The packet delays are then used to create a labeled matrix and a data matrix.

The labeled matrix comprises: Equation (2) $Y^{(c+1) \times (l+u)}$ where the matrix is defined as follows: $y_{ij}=1 (i \leq c)$, if the ith node in the jth scene belongs to the fault node; $y_{ij}=1 (i=c+1)$, if the jth scene has no fault node; or $y_{ij}=0$, otherwise.

The data matrix comprises: Equation (3) $X^{Dx(l+u)}$. The connection between nodes in a physically condensed region can not be easily visualized, especially in a network with a large number of nodes. The topology and packet propagation delays are reorganized by topology and delay processing by building a hierarchical connection with the delay values. These processes are then applied to each scene to convert the scene data into a specific matrix.

Assuming a normal packet transmission path, the topology processing utilizes Dijkstra's algorithm to estimate the minimum packet transmission path of every node. A two-dimension matrix is used to present this arrangement, where each row represents a unique path, and each column number represents the distance from the source node. The paths sharing the most similar higher-level nodes are arranged together.

During the delay processing, data in a window is used to extract the packet propagation delays from the sensor nodes. The delays are arranged into delay groups, which are a group of delays corresponding to the same source node in the window consisting of consecutive packets received by the sink node. The mode of each delay group is estimated to represent the packet propagation delay from the source node at the time of instance. The delay values of each source node are then assigned to the related matrix element.

The training stage comprises: construction of a graph using the Gaussian function, use of the label propagation procedure, and output of the resulting values. To construct the Gaussian graph, the similarities between any two data vectors must be evaluated. A similarity matrix can be approximated by a $\hat{G}=(\hat{V},\hat{E})$ where $\hat{v}$ is the vertex set of $\hat{G}$ associated with a weight matrix containing the local information between two nearby data vectors. The weight matrix is defined as: Equation (4)

$$w_{ij}=\exp(-\|x_i-x_j\|^2/2\sigma^2) x_i \in N_k(x_j) \text{ or } x_j \in N_k(x_i).$$

The label propagation procedure is used to predict the labels of unlabeled data vectors based on a semi-supervised learning process. Let $Y=[y_1, y_2, \ldots, y_{l+u}] \in R^{(c+1) \times (l+u)}$ be the initial labels of all samples $x_j$, $y_{ij}=1$ if $i=c+1$, otherwise $y_{ij}=0$. An additional class, c+1, is added to detect outliers hence the sum of each column of Y is equal to 1. Let $F=[f_1, f_2, \ldots, f_{l+u}] \in R^{(c+1) \times (l+u)}$ be the predicted soft label matrix, where $f_i$ are row vectors satisfying $0 \leq f_{ij} \leq 1$.

A stochastic matrix, $P=\hat{D}^{-1}W$, is created where $\hat{D}$ is the diagonal matrix with each element being $d_{ii}=\Sigma_{i=1}^{l+u} w_{ij}$. During the iterative process of label propagation, the label of each labeled data vector is partially received from its neighboring data vectors and the rest from its own label. Therefore, the label information of the data at t+1 iteration can be represented by: Equation (5) $F(t+1)=F(t)PI_\alpha+YI_\beta$, where $1_\alpha \in R^{(l+u) \times (l+u)}$ is a diagonal matrix with each element being $a_j$, $I_\beta=I-I_\alpha$, and $\alpha_j (0 \leq a_j \leq 1)$ is a parameter for $x_j$ to balance the initial label information of $x_j$ and the label information received from its neighbors during the iteration. The regularization parameter $\alpha_j$ for the labeled data $x_j$ is set to $\alpha_i$; for the unlabeled data vector $x_j$, it is set to $\alpha_u$ in the simulations. The iterative process in Equation (5) yields: Equation (6) $F(t)=F(0)(PI_\alpha)^t+YI_\beta \Sigma_{b=n}^{t-1}(PI_\alpha)^k$, which converges to Equation (7) $F=\lim_{t \to \infty} F(t)=YI_\beta(1-PI_\alpha)^{-1}$. The sum of each column of F is equal to 1, which indicates that the elements in F are values $f_{ij}$ can be seen as the posterior probability of $x_j$ belonging to the ith class. When $i=c+1$, $f_{ij}$ represents the probability of $x_j$ belonging to the outliers.

The detection stage comprises determining the label of the jth unlabeled data vector by $c_j=\text{arcmax}_i f_{ij}$ and making a decision. If $c_j \leq 100$, then the $c_j$th node in the jth data vector belongs to the fault node, but if $c_j=101$, then the jth data vector is normal and has no fault nodes.

Referring now to FIG. 1, illustrated is a data vector propagation scene of faulty data vectors 106, normal data vectors 104, and unlabeled data vectors 108 within the network of data vectors 100. Faulty data vectors 106 are faulty because they contain at least one faulty node. Consequently, normal data vectors 104 are normal because they do not contain a faulty node. Both faulty and normal data vectors can be labeled as such or unlabeled. For purposes of this embodiment, this example is confined to the subset 102 of the network of data vectors 100. Within the subset 102 there is one labeled faulty data vector 106, which is neighbored by several unlabeled data vectors 108. The faulty data vector 106 can be identified because a sink node within the WSN does not receive any packets from at least one faulty node within the faulty data vector 106, which is why data vector is faulty.

As part of this example, the labeled faulty data vector 106 can propagate its faulty node information to the neighboring unlabeled data vectors 108. The information propagated from the labeled faulty data vector 106 can include packet data, time transmissions from source node to sink node, statistical mode data on time transmissions from source node to sink node, or the like.

Figure 2:
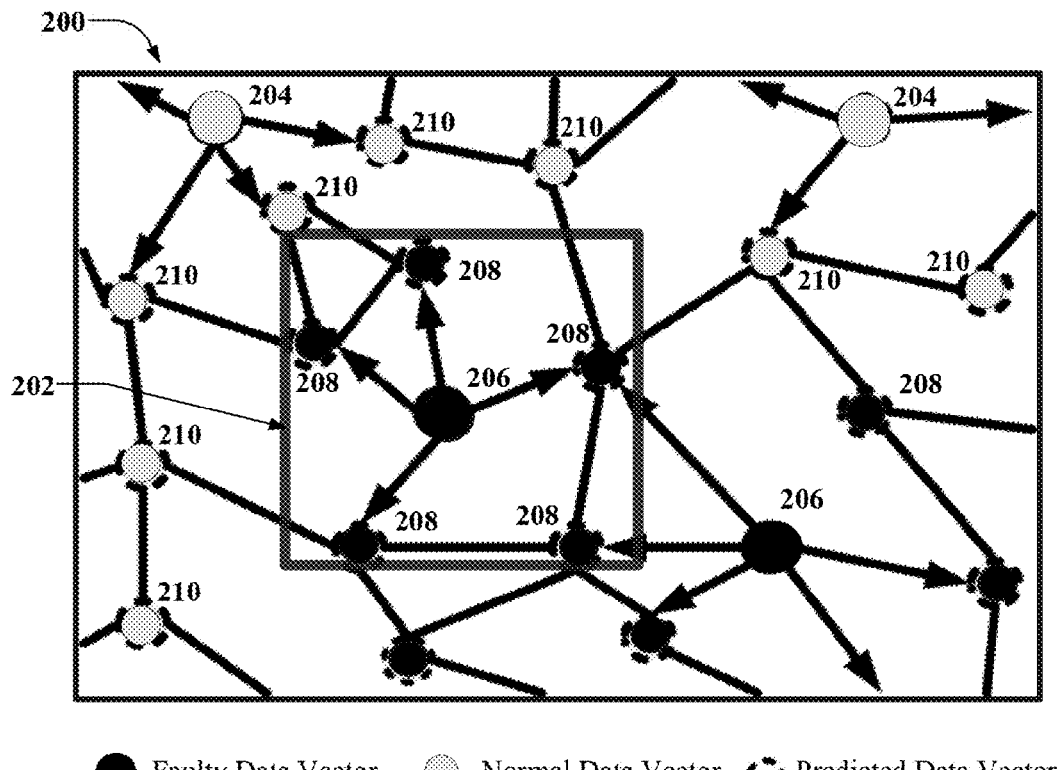
FIG. 2 illustrates a data vector scene of faulty, normal, and predicted data vectors.

Referring now to FIG. 2, illustrated is a data vector propagation scene of faulty data vectors 206, normal data vectors 204, and predicted data vector 208 labels within the network of data vectors 200. Faulty data vectors 206 are faulty because they contain at least one faulty node. Consequently, normal data vectors 204 are normal because they do not contain any faulty nodes. Both faulty and normal data vectors can be labeled as such or predicted. FIG. 2 represents the network of data vectors 200 having all data vectors labeled, or their labels predicted using the aforementioned label propagation procedure.

The label propagation procedure can be used for both faulty and normal data vectors, aiding in the prediction of faulty data vector 208 labels and normal data vector 210 labels. For purposes of this embodiment, this example is confined to subset 202 of the network of data vectors 200. Within subset 202 there is one labeled faulty data vector 206, which is neighbored by several faulty predicted data vector 208 labels. Faulty data vector 206 can be identified because a sink node within the WSN does not receive any packets from at least one faulty node within the faulty data vector 206.

As part of this example, the labeled faulty data vector 206 can propagate its faulty node information to the neighboring data vectors, thus aiding in the prediction of faulty data vector 208 labels. As illustrated by FIG. 2, all of the faulty data vector's 206 neighbors within subset 202 can be predicted as being faulty. Conversely, within the larger network of data vectors 200 there are labeled normal data vectors 204, which can use label propagation to predict normal data vectors 210.

Figure 3:
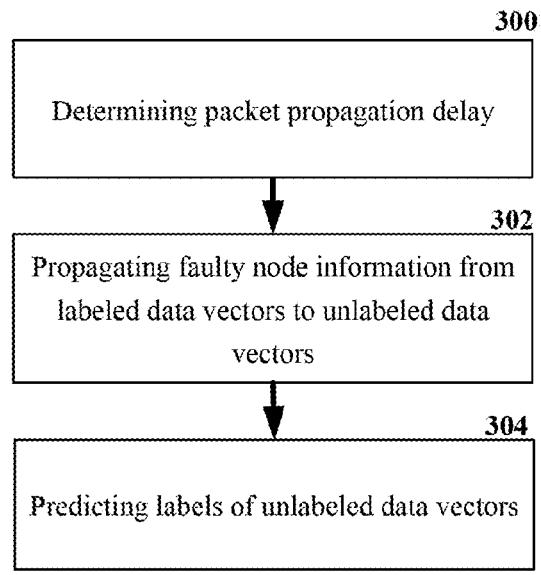
FIG. 3 illustrates a method that can be used to predict faulty node information of unlabeled data vectors.

FIGS. 3-9 illustrate methods that facilitate fault detection within a WSN. For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a computer readable storage medium) to facilitate transporting and transferring such methodologies to computers. The term article of manufacture, as used herein, is intended to encompass a computer program accessible from any computer-readable device, carrier, or media, including a non-transitory computer readable storage medium Referring now to FIG. 3, illustrated is a method that can be used to predict faulty node information of unlabeled data vectors. To determine if a data vector is faulty or normal, the nodes associated with the data vector can be determined as faulty or normal. Packet propagation delay 300 can be based on the transmission time from the source node to the sink node during the preprocessing stage. A longer delay than normal can indicate a faulty node within the WSN.

Once the packet propagation delay has been determined 300, the faulty nodes associated with any delay can be included in the data vector, and the data vector can be labeled as faulty. Conversely, normal data vectors, without any faulty nodes, can be labeled as normal. During the training stage, the faulty and normal node information of labeled data vectors can be propagated to the unlabeled data vectors in element 302. The information propagated to the unlabeled data vectors can help predict the labels of unlabeled data vectors in element 304.

Figure 4:
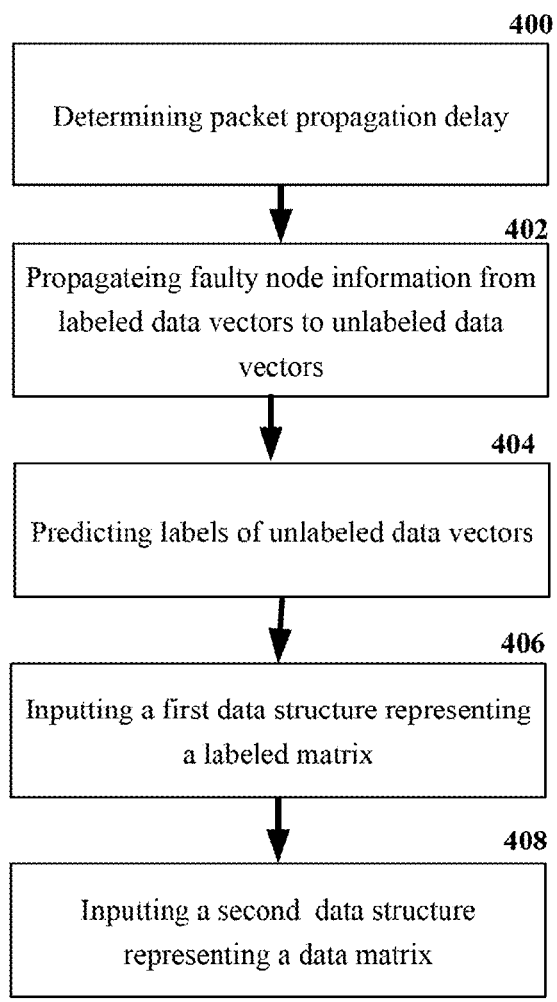
FIG. 4 illustrates a schematic process flow diagram of a method that can be used to predict faulty and node information of unlabeled data vectors by inputting data structures representing labeled matrices.

Referring now to FIG. 4, illustrated is a schematic process flow diagram of a method that can be used to predict faulty and normal node information of unlabeled data vectors by inputting data structures representing labeled matrices. To determine if a data vector is faulty or normal, the nodes associated with the data vector can be determined as faulty or normal. Packet propagation delay 400 can be based on the transmission time from the source node to the sink node during the preprocessing stage. A longer delay than normal can indicate a faulty node within the WSN.

Once the packet propagation delay has been determined 400, the faulty nodes associated with any delay can be included in the data vector and the data vector can be labeled as faulty. Conversely, normal data vectors, without any faulty nodes, can be labeled as normal. During the training stage, the faulty and normal node information of labeled data vectors can be propagated to the unlabeled data vectors in element 402. The information propagated to the unlabeled data vectors can help predict the labels of unlabeled data vectors in element 404. During the preprocessing stage, matrices can be used to represent delay propagation data. For instance, both faulty and normal scenes can be represented by Equation (2) in element 406; and the scene data can be converted into specific matrices represented by Equation (3) in element 408.

Figure 5:
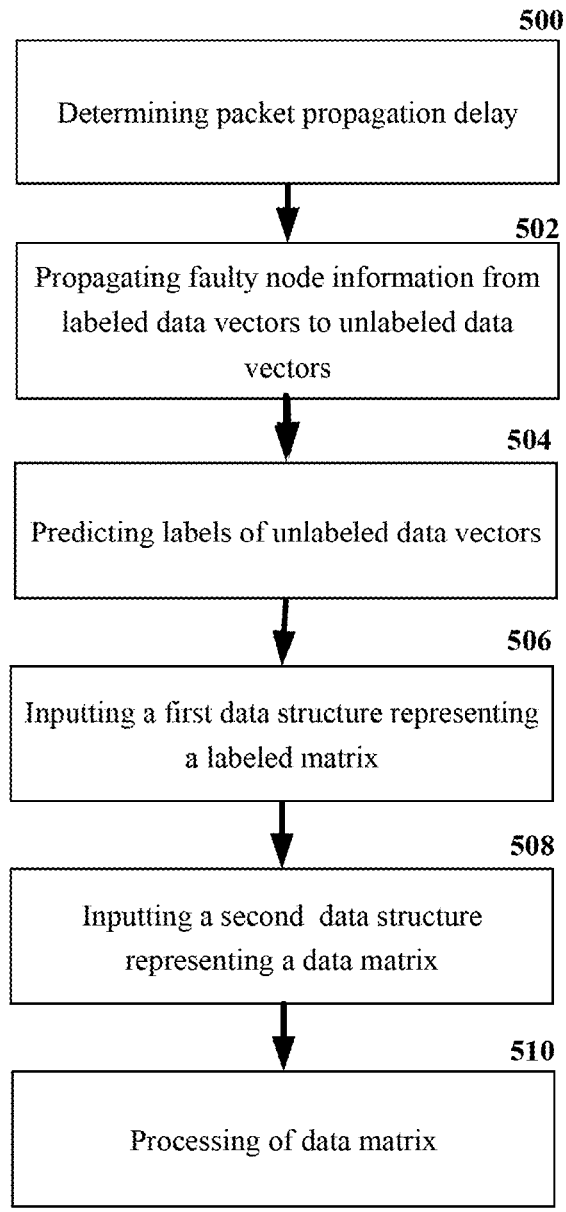
FIG. 5 illustrates a schematic process flow diagram of a method that can be used to predict faulty node information of unlabeled data vectors by inputting data structures representing labeled matrices and processing the labeled matrix data.

Referring now to FIG. 5, illustrated is a schematic process flow diagram of a method that can be used to predict faulty node information of unlabeled data vectors by inputting data structures representing labeled matrices and processing the labeled matrix data. To determine if a data vector is faulty or normal, the nodes associated with the data vector can be determined as faulty or normal. Packet propagation delay 500 can be based on the transmission time from the source node to the sink node during the preprocessing stage. A longer delay than normal can indicate a faulty node within the WSN.

Once the packet propagation delay has been determined 500, the faulty nodes associated with any delay can be included in the data vector and the data vector is labeled as faulty. Conversely, normal data vectors, without any faulty nodes, can be labeled as normal. During the training stage, the faulty and normal node information of labeled data vectors can be propagated to the unlabeled data vectors in element 502. The information propagated to the unlabeled data vectors can help predict the labels of unlabeled data vectors in element 504. During the preprocessing stage, matrices can be used to represent delay propagation data. For instance, both faulty and normal scenes can be represented by Equation (2) in element 506; and the scene data can be converted into specific matrices represented by Equation (3) in element 508.

Element 510 can apply topology and delay processing to element 508 to convert data into a specific matrix form. Topology processing can use a two-dimensional matrix to present the estimated transmission path, where each row can represent a unique path and the column number can represent the distance from the source node. The paths sharing the most similar higher-level nodes can be arranged together. During the delay processing, the propagation delays can be arranged into groups corresponding to the same source node in the window consisting of consecutive packets received by the sink node. The mode of each delay group can be estimated to represent the packet propagation delay from the source node at the time of instance. The delay values of each source node can then be assigned to the related matrix element.

Figure 6:
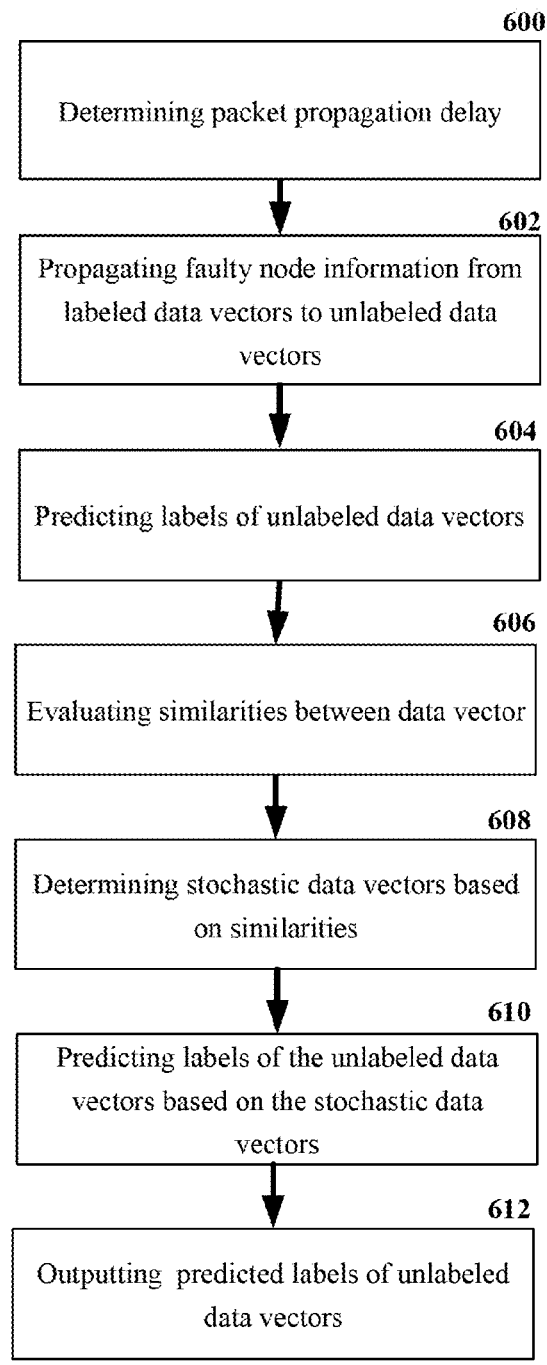
FIG. 6 illustrates a schematic process flow diagram of a method that can be used to predict faulty node information of unlabeled data vectors based on probabilistic similarities between data vectors.

Referring now to FIG. 6, illustrate is a schematic process flow diagram of a method that can be used to predict faulty node information of unlabeled data vectors based on probabilistic similarities between data vectors. To determine if a data vector is faulty or normal, the nodes associated with the data vector can be determined as faulty or normal. Packet propagation delay 600 can be based on the transmission time from the source node to the sink node during the preprocessing stage. A longer delay than normal can indicate a faulty node within the WSN.

Once the packet propagation delay has been determined 600, the faulty nodes associated with any delay can be included in the data vector and the data vector can be labeled as faulty. Conversely, normal data vectors, without any faulty nodes, can be labeled as normal. During the training stage, the faulty and normal node information of labeled data vectors can be propagated to the unlabeled data vectors in element 602. The information propagated to the unlabeled data vectors can help predict the status of unlabeled data vectors in element 604.

A similarity matrix can be defined to evaluate similarities between data vectors 606. Similarities between neighboring data vectors can be used to help predict the status of unlabeled data vectors as defined by Equation (4). A stochastic data matrix can be utilized to determine the probability of a specific data vector outcome in element 608 and can be based upon the data generated by the similarity matrix in element 606. Element 610 further bases label prediction on element 608 by incorporating the stochastic data matrix into a soft label matrix represented by Equation (6). Once the soft label matrix has been generated, the predicted labels of unlabeled data vectors can output the results of element 612 to highlight the faulty data vectors within the WSN.

Figure 7:
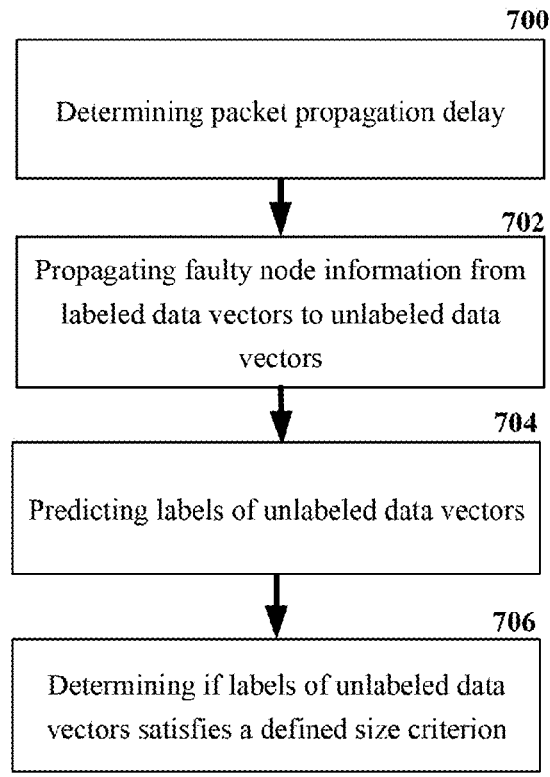
FIG. 7 illustrates a schematic process flow diagram of a method that can be used to predict faulty node information of unlabeled data vectors by determining if the unlabeled data vectors satisfy a defined criterion.

Referring now to FIG. 7, illustrated is a schematic process flow diagram of a method that can be used to predict faulty node information of unlabeled data vectors by determining if the unlabeled data vectors satisfy a defined criterion. To determine if a data vector is faulty or normal, the nodes associated with the data vector can be determined as faulty or normal. Packet propagation delay 700 can be based on the transmission time from the source node to the sink node during the preprocessing stage. A longer delay than normal can indicate a faulty node within the WSN.

Once the packet propagation delay has been determined 700, the faulty nodes associated with any delay can be included in the data vector and the data vector is labeled as faulty. Conversely, normal data vectors, without any faulty nodes, can be labeled as normal. During the training stage, the faulty and normal node information of labeled data vectors can be propagated to the unlabeled data vectors in element 702. The information propagated to the unlabeled data vectors can help predict the status of unlabeled data vectors in element 704.

During the detection stage, the labels of all unlabeled scenes can be determined. This determination is partly based on determining if the labels of the unlabeled data vectors can satisfy a defined size criterion 706. The defined size criterion can be the largest label, $c_j$, of an unlabeled scene as determined by $c_j = \text{arcmax}_i f_{ij}$.

Figure 8:
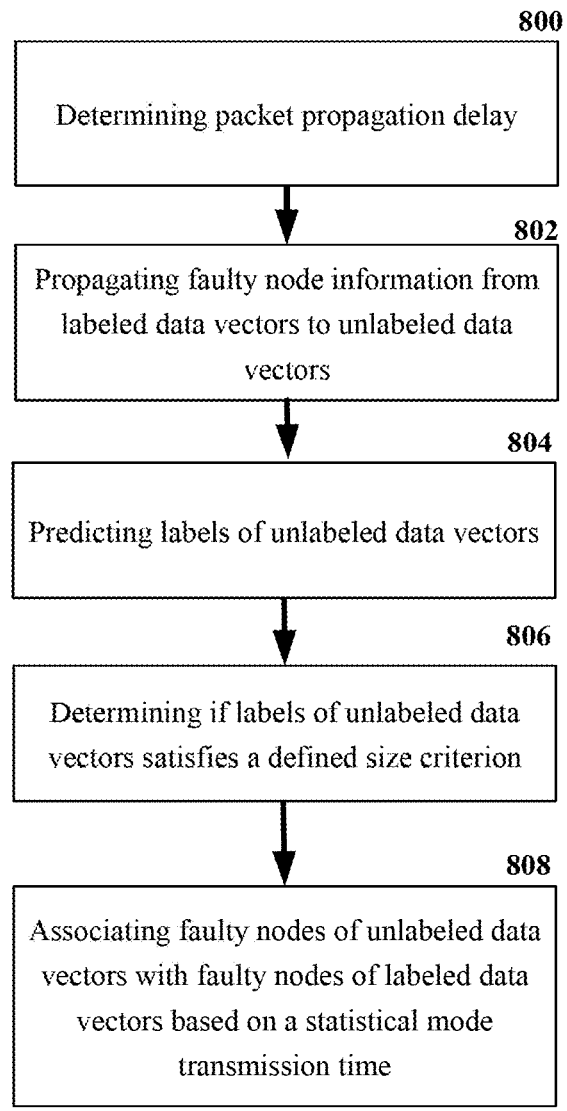
FIG. 8 illustrates a schematic process flow diagram of a method that can be used to predict faulty node information of unlabeled data vectors and determine if the unlabeled data vectors satisfy criterion and receive statistical mode information.

Referring now to FIG. 8, illustrated is a schematic process flow diagram of a method that can be used to predict faulty node information of unlabeled data vectors and determine if the unlabeled data vectors satisfy criterion and receive statistical mode information. Referring now to determine if a data vector is faulty or normal, the nodes associated with the data vector can be determined as faulty or normal. Packet propagation delay 800 can be based on the transmission time from the source node to the sink node during the preprocessing stage. A longer delay than normal can indicate a faulty node within the WSN.

Once the packet propagation delay has been determined 800, the faulty nodes associated with any delay can be included in the data vector and the data vector is labeled as faulty. Conversely, normal data vectors, without any faulty nodes, can be labeled as normal. During the training stage, the faulty and normal node information of labeled data vectors can be propagated to the unlabeled data vectors in element 802. The information propagated to the unlabeled data vectors can help predict the status of unlabeled data vectors in element 804.

During the detection stage, the labels of all unlabeled scenes can be determined. This determination is partly based on determining if the labels of the unlabeled data vectors can satisfy a defined size criterion 806. The defined size criterion can be the largest label, $c_j$, of an unlabeled scene as determined by $c_j = \text{arcmax}_i f_{ij}$. For very large windows of propagation data, the statistical mode of each propagation delay group can be estimated to represent the packet propagation delay and included in the data vectors generated for each scene. Element 808 can associate nodes of unlabeled data vectors with nodes of labeled data vectors based on the statistical modes generated from the propagation delay.

Figure 9:
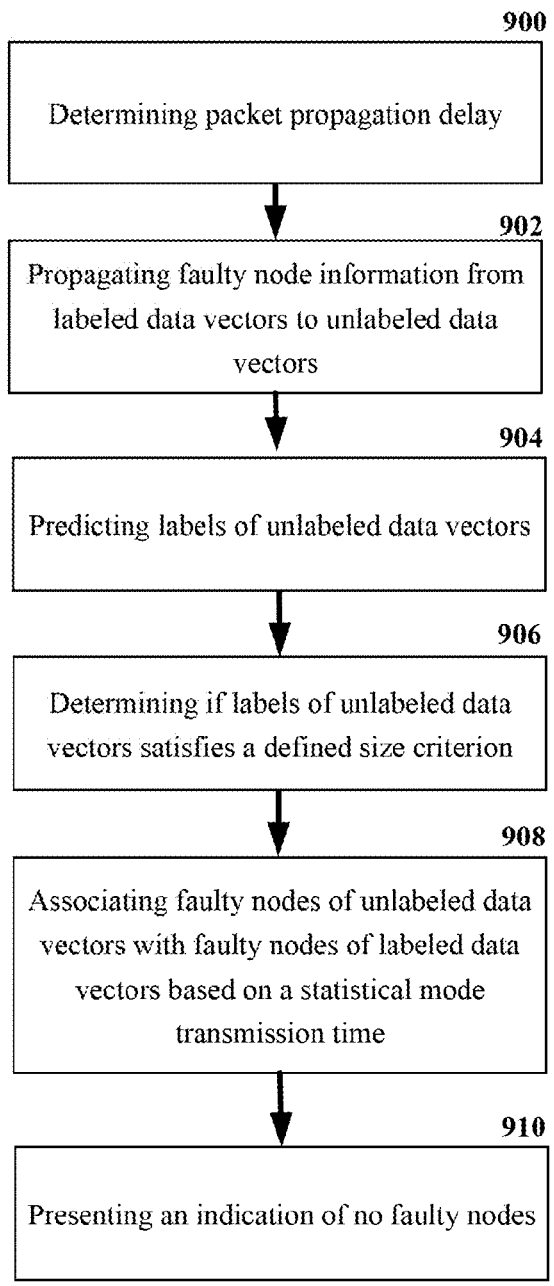
FIG. 9 illustrates a schematic process flow diagram of a method that can be used to predict faulty node information of unlabeled data vectors by determining if the unlabeled data vectors satisfy defined criterion, receive statistical mode information, and present an indication of faulty nodes.

Referring now to FIG. 9, illustrated is a schematic process flow diagram of a method that can be used to predict faulty node information of unlabeled data vectors by determining if the unlabeled data vectors satisfy defined criterion, receive statistical mode information, and present an indication of faulty nodes. To determine if a data vector is faulty or normal, the nodes associated with the data vector can be determined as faulty or normal. Packet propagation delay 900 can be based on the transmission time from the source node to the sink node during the preprocessing stage. A longer delay than normal can indicate a faulty node within the WSN.

Once the packet propagation delay has been determined 900, the faulty nodes associated with any delay can be included in the data vector and the data vector can be labeled as faulty. Conversely, normal data vectors, without any faulty nodes, can be labeled as normal. During the training stage, the faulty and normal node information of labeled data vectors can be propagated to the unlabeled data vectors in element 902. The information propagated to the unlabeled data vectors can help predict the status of unlabeled data vectors in element 904.

During the detection stage, the labels of all unlabeled scenes can be determined. This determination can be partly based on determining if the labels of the unlabeled data vectors satisfy a defined size criterion 906. The defined size criterion can be the largest label, $c_j$, of an unlabeled scene as determined by $c_j = \text{arcmax}_i f_{ij}$. For very large windows of propagation data, the statistical mode of each propagation delay group can be estimated to represent the packet propagation delay and included in the data vectors generated for each scene. Element 908 can associate nodes of unlabeled data vectors with nodes of labeled data vectors based on the statistical modes generated from the propagation delay. Once the label propagation has taken place, an indication of a normal scene and no faulty nodes can be presented at element 910 if $c_j=101$.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, rest room), and telephone. This includes at least WiFi and Bluetooth™ wireless technologies. Thus, the communication can be a predefined structure as with a conventional network or simply an ad hoc communication between at least two devices.

WiFi, or Wireless Fidelity, allows connection to the Internet from a couch at home, a bed in a hotel room, or a conference room at work, without wires. WiFi is a wireless technology similar to that used in a cell phone that enables such devices, e.g., computers, to send and receive data indoors and out; anywhere within the range of a base station. WiFi networks use radio technologies called IEEE 802.11 (a, b, g, etc.) to provide secure, reliable, fast wireless connectivity. A WiFi network can be used to connect computers to each other, to the Internet, and to wired networks (which use IEEE 802.3 or Ethernet). WiFi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   determining, by a system comprising a processor, one or more propagation delays associated with one or more packets of a network;
   propagating, by the system, data of one or more faulty node devices of one or more labeled data vectors associated with the one or more propagation delays;
   predicting, by the system, one or more other faulty node devices of one or more unlabeled data vectors;
   based on the predicting the one or more other faulty node devices, determining a label of the one or more unlabeled data vectors; and
   in response to the determining the label of the one or more unlabeled data vectors, associating the one or more unlabeled data vectors with the one or more other faulty node devices.

2. The method of claim 1, further comprising:
   inputting, by the system, a first data structure representing a labeled matrix and a second data structure representing a data matrix to determine the propagation delay.

3. The method of claim 2, wherein the inputting of the second data structure representing a data matrix comprises topology processing of one or more paths associated with the one or more propagation delays and delay processing of the one or more propagation delays.

4. The method of claim 1, wherein propagating the information comprises:
   evaluating, by the system, similarities between data vectors;
   determining, by the system, one or more stochastic data vectors based on the similarities;
   predicting, by the system, one or more labels of the one or more unlabeled data vectors based on the one or more stochastic data vectors; and
   outputting, by the system, the predicted one or more labels of the one or more unlabeled data vectors.

5. The method of claim 1, wherein the predicting the one or more other faulty node devices of the one or more unlabeled data vectors comprises determining one or more labels of the one or more unlabeled data vectors satisfies a defined size criterion.

6. The method of claim 5, further comprising:
   associating, by the system, the one or more other faulty node devices of the one or more unlabeled data vectors with the one or more faulty node devices of the one or more labeled data vectors based on a statistical mode transmission time.

7. The method of claim 5, further comprising:
   presenting, by the system, an indication of no faulty node devices of the one or more unlabeled data vectors based on a determination that another one or more labels of the one or more unlabeled data vectors satisfies a defined condition.

8. A computer-readable storage device comprising executable instructions that, in response to execution, cause a system comprising a processor to perform operations, comprising:
   determining one or more propagation delays associated with one or more packets of a wireless sensor network during a preprocessing stage;
   propagating transmission times of one or more faulty node devices of one or more labeled data vectors associated with the one or more propagation delays during the preprocessing stage;
   predicting one or more other faulty node devices of one or more unlabeled data vectors during a training stage;
   based on the predicting the one or more other faulty node devices, determining, during a detection stage, a label of the one or more unlabeled data vectors; and
   in response to a condition associated with the faulty node devices being determined to have been satisfied, associating the one or more unlabeled data vectors with the one or more other faulty node devices.

9. The computer-readable storage device of claim 8, further comprising:
   inputting a first data structure and a second data structure to determine the propagation delay.

10. The computer-readable storage device of claim 9, wherein the inputting of the first data structure comprises topology processing of paths associated with the one or more propagation delays and delay processing of the one or more propagation delays.

11. The computer-readable storage device of claim 8, wherein propagating information of the one or more faulty node devices comprises:
    generating, by a neighborhood graph, similarities between data vectors;
    determining one or more stochastic data vectors based on the similarities;
    predicting one or more labels of the one or more unlabeled data vectors based on the one or more stochastic data vectors; and
    outputting the predicted one or more labels of the one or more unlabeled data vectors.

12. The computer-readable storage device of claim 8, wherein the predicting the one or more other faulty node devices of the one or more unlabeled data vectors comprises determining one or more labels of the one or more unlabeled data vectors is less than a defined number.

13. The computer-readable storage device of claim 8, wherein the predicting the one or more other faulty node devices of the one or more unlabeled data vectors comprises determining one or more labels of the one or more unlabeled data vectors is equal to a defined number.

14. The computer-readable storage device of claim 8, further comprising:
    presenting an indication of faulty node devices of the one or more unlabeled data vectors based on a repeated transmission time.

15. An apparatus comprising:
    a memory to store executable instructions; and
    a processor, coupled to the memory, that executes or facilitates execution of the executable instructions to at least:
    determine one or more propagation delays, resulting in propagation delay data, associated with one or more packets of a network;
    propagate node device transmission time data of one or more faulty node devices of one or more labeled data vectors associated with the one or more propagation delays;
    predict one or more other faulty node devices of one or more unlabeled data vectors; and
    in response to a first defined condition associated with the faulty node devices being determined to have been satisfied, associating the one or more unlabeled data vectors with the one or more other faulty node devices.

16. The apparatus of claim 15, wherein the processor further executes or facilitates execution of the executable instructions to input a first data structure representing a labeled matrix and a second data structure representing a data matrix to determine the propagation delay.

17. The apparatus of claim 15, wherein the processor further executes or facilitates execution of the executable instructions to:
    evaluate, similarities between data vectors;
    determine one or more stochastic data vectors based on the similarities;
    predict one or more labels of the one or more unlabeled data vectors based on the one or more stochastic data vectors; and
    output the predicted one or more labels of the one or more unlabeled data vectors.

18. The apparatus of claim 15, wherein the faulty node devices of the unlabeled data vector being identified comprises a determination of a statistic mode.

19. The apparatus of claim 15, wherein the processor further executes or facilitates execution of the executable instructions to:
    associate one or more faulty node devices of an unlabeled data vector with one or more faulty node devices of a labeled data vector based on a determination that an unlabeled data vector satisfies a second defined condition.

20. The apparatus of claim 19, wherein the processor further executes or facilitates execution of the executable instructions to present an indication of no faulty node devices of the unlabeled data vector based on a determination that the unlabeled data vector satisfies a third defined condition.

* * * * *